US011012678B2

(12) United States Patent
Choi (10) Patent No.: US 11,012,678 B2
(45) Date of Patent: May 18, 2021

(54) SCANNING AN OBJECT IN THREE DIMENSIONS USING COLOR DASHED LINE PATTERN (71) Applicants: VATECH Co., Ltd., Gyeonggi-do (KR); VATECH EWOO Holdings Co., Ltd., Gyeonggi-do (KR)

(72) Inventor: Sung Il Choi, Gyeonggi-do (KR)

(73) Assignees: VATECH Co., Ltd., Gyeonggi-do (KR); VATECH EWOO Holdings Co., Ltd., Gyeonggi-do (KR)

(*) Notice: Subject to any disclaimer, the term of this patent is extended or adjusted under 35 U.S.C. 154(b) by 0 days.

(21) Appl. No.: 16/523,445

(22) Filed: Jul. 26, 2019

(65) Prior Publication Data
US 2019/0349570 A1 Nov. 14, 2019

Related U.S. Application Data (63) Continuation of application No. 15/147,886, filed on May 5, 2016, now abandoned.

(30) Foreign Application Priority Data

Feb. 5, 2016 (KR) .................. 10-2016-0014842

(51) Int. Cl.
*H04N 13/254* (2018.01)
*G01B 11/25* (2006.01)
(Continued)

(52) U.S. Cl.
CPC ....... *H04N 13/254* (2018.05); *G01B 11/2509* (2013.01); *G01B 11/2513* (2013.01); *H04N 13/257* (2018.05); *A61C 9/006* (2013.01);
*A61C 9/0053* (2013.01); *A61C 13/0004* (2013.01); *H04N 1/00827* (2013.01)

(58) Field of Classification Search
CPC .................. G01B 11/2509; G01B 11/2513
See application file for complete search history.

(56) References Cited

U.S. PATENT DOCUMENTS 6,813,035 B2  11/2004 Hoffmann
7,474,415 B2   1/2009 Lin et al.
(Continued)

FOREIGN PATENT DOCUMENTS

JP  2012-251893 A  12/2012
WO     01/84479 A1  11/2001

OTHER PUBLICATIONS

European Patent Office, Partial European Search Report of corresponding EP Patent Application No. 16168535.9, dated Nov. 4, 2016.
(Continued)

*Primary Examiner* — David N Werner
(74) *Attorney, Agent, or Firm* — IP Legal Services, LLC (57) ABSTRACT The disclosure is related to a method and apparatus of scanning a target object in three dimensions (3D). The method may include projecting a color dashed line pattern onto a target object, scanning the target object with the color dashed line pattern projected thereto, and producing a 3D data of the target object by processing the scanning result. The color dashed line pattern may include multiple dashed line patterns each of which is individually used to calculate the 3D data of the target object.

8 Claims, 4 Drawing Sheets (51) Int. Cl.
*H04N 13/257* (2018.01)
*A61C 9/00* (2006.01)
*H04N 1/00* (2006.01)
*A61C 13/00* (2006.01)

(56) References Cited

U.S. PATENT DOCUMENTS

| | | |
|---|---|---|
| 2002/0015934 A1 | 2/2002 | Rubbert et al. |
| 2003/0016366 A1* | 1/2003 | Takeda ............... G01B 11/2513 356/604 |
| 2003/0023475 A1 | 1/2003 | Fergusson et al. |
| 2003/0096210 A1 | 5/2003 | Rubbert et al. |
| 2004/0222987 A1* | 11/2004 | Chang .................. G06K 9/2036 345/419 |
| 2006/0079981 A1 | 4/2006 | Rubbert et al. |
| 2009/0291417 A1 | 11/2009 | Rubbert et al. |
| 2010/0309328 A1* | 12/2010 | Ehrick ............... G01B 11/2513 348/222.1 |
| 2012/0092461 A1 | 4/2012 | Fisker et al. |
| 2013/0093881 A1* | 4/2013 | Kuwabara ............. G01B 11/25 348/135 |
| 2013/0141544 A1 | 6/2013 | Tsuyuki |
| 2014/0028801 A1* | 1/2014 | Tin ..................... G01B 11/2513 348/46 |
| 2014/0285816 A1* | 9/2014 | Yamazaki .......... G01B 11/2509 356/610 |
| 2015/0054922 A1 | 2/2015 | Fisker et al. |
| 2015/0072313 A1 | 3/2015 | Thiel et al. |
| 2015/0103358 A1* | 4/2015 | Flascher ............ G01B 11/2513 356/603 |
| 2015/0109423 A1 | 4/2015 | Shimodaira |
| 2015/0176893 A1 | 6/2015 | Revington et al. |
| 2015/0229907 A1 | 8/2015 | Bridges et al. |
| 2016/0205376 A1 | 7/2016 | Tsuyuki |
| 2016/0253815 A1* | 9/2016 | Tokimitsu ............ H04N 13/254 348/136 |
| 2017/0038196 A1* | 2/2017 | Lee ......................... H04N 9/43 |
| 2017/0230636 A1* | 8/2017 | Choi .................... H04N 13/257 |

OTHER PUBLICATIONS

European Patent Office, Extended European Search Report of corresponding EP Patent Application No. 16168535.9, dated Mar. 22, 2017.

* cited by examiner

SCANNING AN OBJECT IN THREE DIMENSIONS USING COLOR DASHED LINE PATTERN

CROSS REFERENCE TO PRIOR APPLICATIONS

The present application is continuation application of U.S. patent application Ser. No. 15/147,886 (filed on May 5, 2016), which claims priority under 35 U.S.C. § 119 to Korean Patent Application No. 10-2016-0014842 (filed on Feb. 5, 2016).

BACKGROUND

The present disclosure relates scanning a target object in three dimensions (3D) and, more particularly, to a dental 3D scanner for scanning a target object using a color dashed line pattern.

Lately, a dental three dimension (3D) scanner has been introduced. Such a dental 3D scanner is used to obtain a 3D image of a target object in an intraoral structure for dental examination or dental treatment. In particular, the dental 3D scanner may project a predetermined measurement light onto a target object, capture an image of the target object with the measurement light projected thereon, and reconstruct the 3D image of the target object based on the captured measurement light image.

A typical dental 3D scanner might require capturing multiple target object images with several different measurement light patterns in order to obtain the 3D image of the target object. Accordingly, with the typical dental 3D scanner, a designated profession may perform the same scanning operation several times. Since the designated profession must put the typical dental 3D scanner inside the patient's mouth, such operation might be very annoying and inconvenient to both of the designated profession and a patient.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present disclosure overcome the above disadvantages and other disadvantages not described above. Also, embodiments of the present disclosure are not required to overcome the disadvantages described above, and embodiments of the present disclosure may not overcome any of the problems described above.

In accordance with an aspect of the present embodiment, a 3D image of an intraoral structure of a patient may be precisely and completely obtained at a comparatively short time with fewer scanning operations.

In accordance with another aspect of the present embodiment, a color dashed line pattern having multiple dashed line patterns may be generated and projected onto a target object to precisely, efficiently, and completely scan the target object in 3D.

In accordance with still another aspect of the present embodiment, a 3D scanner may generate a color dashed line pattern having multiple dashed line patterns, project the generated color dashed line pattern onto a target object, capture images of the target object with the color dashed line pattern thereon, and generate 3D image data (e.g., depth data) of the target object.

In accordance with yet another aspect of the present embodiment, multiple dashed line patterns may be isolated from an image of a target image with a color dashed line pattern projected thereon.

In accordance with at least one embodiment, a method may be provided for scanning a target object in three dimensions (3D). The method may include projecting a color dashed line pattern onto a target object, scanning the target object with the color dashed line pattern projected thereto, and producing a 3D data of the target object by processing the scanning result. The color dashed line pattern includes multiple dashed line patterns each of which is individually used to calculate the 3D data of the target object.

The color dashed line pattern may include the multiple dashed line patterns. Each one of the multiple dashed line patterns may have a unique color different from the other. Each dashed line pattern may be formed of a plurality of dashed lines. Each dashed line may be formed of a plurality of dashes. Each dash may be formed of a unit pixel. Dashed lines included in each dashed line patterns may be arranged to have a line gap greater than a dash gap, where the line gap is a gap between two adjacent dashed lines, and the dash gap is a gap between two adjacent dashes.

The forming may include i) generating a color dashed line pattern to include at least two dashed line pattern, ii) generating each dashed line pattern to have a unique color different from the other, and iii) generating dashed lines of each dashed line patterns to be arranged to have a line gap greater than a dash gap.

The forming may include i) generating the color dashed line pattern to include at least two first patterns and at least two second patterns, ii) generating the at least two first patterns to be arranged in a first direction, iii) generating the at least two second patterns to be arranged in a second direction crossing the first direction, iv) generating the first patterns to have a first color, v) generating the first patterns to have a plurality of first unit patterns each having a length of m pixels, wherein m is a positive integer greater than 0, vi) generating the plurality of first unit patterns to be arranged with a third unit pattern having a length of n pixels as a gap between two adjacent first unit patterns, wherein the third unit pattern has a third color and a third length, and n is a positive integer number greater than 0 and smaller than m, vi) generating the second patterns to have a second color, vii) generating the second patterns to have a plurality of second unit patterns each having a length of m pixels, wherein m is a positive integer greater than 0, and viii) generating the plurality of second unit patterns to be arranged with a fourth unit pattern having a length of n pixels as a gap between two adjacent second unit patterns, wherein the fourth unit pattern has a fourth color and a fourth length, and n is a positive integer number greater than 0 and smaller then m.

The scanning may include capturing at least one color dashed line pattern image of the target object and providing the captured color dashed line pattern image of the target object as the scanning result.

The producing a 3D data may include isolating the multiple dashed line patterns from the scanning results, individually processing each of the isolated multiple dashed line patterns by performing sampling, and generating a depth data of the target object based on the sampling results of the isolated multiple dashed line patterns.

Prior to the projecting, the method may further include generating a color dashed line pattern data upon generation of a predetermined event and forming the color dashed line pattern including multiple dashed line patterns based on the generated color dashed line pattern;

The method may further include providing the 3D data of the target object to a designated machine through a predetermined communication link.

In accordance with another embodiment, an apparatus may be provided for scanning a target object in three dimensions (3D). The apparatus may include a projection circuit, an image capturing circuit, and a processor. The projection circuit may be configured to project a color dashed line pattern onto a target object. The image capturing circuit may be configured to scan the target object with the color dashed line pattern projected thereon. The processor may be configured to produce a 3D data of the target object by processing the scanning result. The color dashed line pattern may include multiple dashed line patterns each of which is individually used to calculate the 3D data of the target object.

In accordance with still another embodiment, a non-transitory machine-readable medium may be provided. Such a non-transitory machine-readable medium may include encoded thereon program code, wherein, when the program code is executed by a machine, the machine implements a method of scanning a target object in three dimensions (3D). The method may include projecting a color dashed line pattern onto a target object, scanning the target object with the color dashed line pattern projected thereto, and producing a 3D data of the target object by processing the scanning result. The color dashed line pattern may include multiple dashed line patterns each of which is individually used to calculate the 3D data of the target object.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Reference will now be made in detail to exemplary embodiments of the present disclosure, examples of which are illustrated in the accompanying drawings, wherein like reference numerals refer to like elements throughout. The embodiments are described below, in order to explain embodiments of the present disclosure by referring to the figures.

In accordance with at least one embodiment, a target object may be instantly, efficiently, and precisely scanned in three dimensions (3D) using a color dashed line pattern. In particular, a target object in an intraoral structure of a person may be scanned in 3D by generating a predetermined color dashed line pattern and projecting the generated color dashed line pattern onto the target object in the intraoral structure. In other words, a dental 3D scanner may generate a color dashed line pattern, project the generated color dashed line pattern onto a target object, capture an image of the target object with the color dashed line pattern projected thereon, isolate multiple dashed line patterns from the captured image, and generate 3D data of the target object based on the isolated multiple dashed line patterns. Such a color dashed line pattern may include multiple dashed line patterns. For example, each dashed line pattern is formed of a plurality of dashes, and each dash is formed of at least one dot. Furthermore, each dashed line pattern has a unique color different from the others. Such multiple dashed line patterns are arranged to satisfy predetermined rules such that a line gap between two adjacent same color dashed lines is greater than a dash gap between two adjacent dashes.

Hereinafter, an apparatus for scanning a target object in 3D using a color dashed line pattern will be described with reference to FIG. 1. For convenience and ease of understanding, a dental 3D scanner will be described as an apparatus for scanning target teeth inside an intraoral structure using a predetermined color dashed line pattern. However, embodiments of the present disclosure are not limited thereto. Embodiments of the present disclosure may be applied to scanning any type of objects precisely, efficiently, and instantly.

Figure 1:
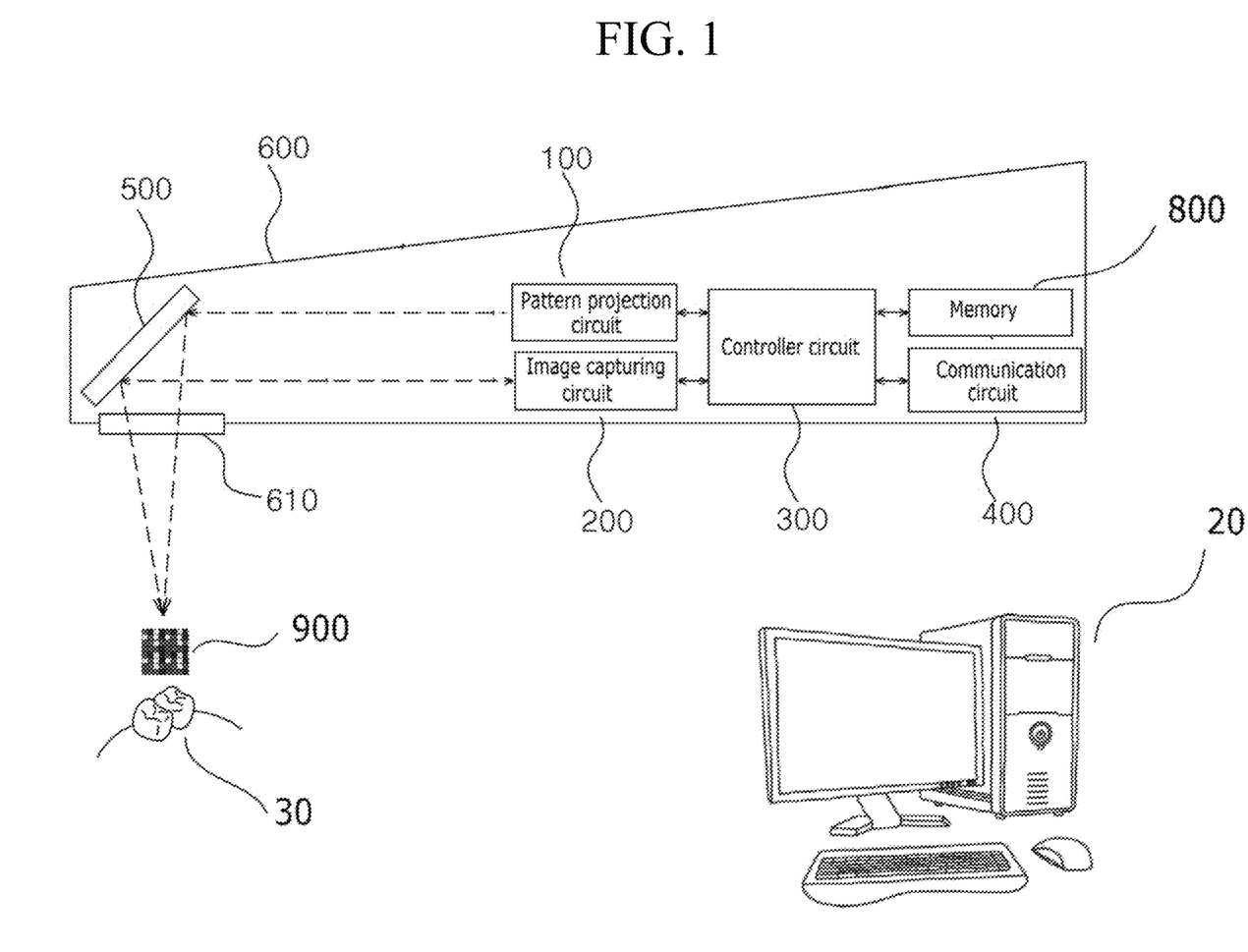
FIG. 1 illustrates a dental 3D scanner for scanning a target object in 3D using a color dashed line pattern in accordance with at least one embodiment.

FIG. 1 illustrates a dental 3D scanner for scanning a target object in 3D using a color dashed line pattern in accordance with at least one embodiment.

Referring to FIG. 1, dental 3D scanner 10 may be connected to analysis device 20 through at least one of a wireless link and a wired link in accordance with at least one embodiment. Such dental 3D scanner 10 may receive a control signal from a designated profession directly or through analysis device 20, scan a target object in 3D, and provide the scanning result to analysis device 20. For example, dental 3D scanner 10 may scan teeth in an intraoral structure using a predetermined color dashed line pattern and transmit the scanning result to other entities through a predetermined communication link.

In particular, dental 3D scanner 10 may have a shape that can be held or grabbed by a hand of a designated profession and be inserted into a mouth of a patient to scan a tooth inside the mouth, as shown in FIG. 1. However, the embodiments of the present disclosure are not limited thereto.

In accordance with at least one embodiment, the predetermined color dashed line pattern may include multiple dashed line patterns. Each of multiple dashed line patterns may be individually analyzed to calculate 3D data (e.g., depth data) of the target object. In particular, such multiple dashed line patterns may be isolated from an image of a target object with the predetermined color dashed line pattern projected thereon, and 3D data of the target object may be calculated individually using each of the isolated multiple dashed line patterns. Accordingly, one color dashed line pattern image of the target object can be used to multiple dashed line patterns to calculate the 3D data of the target object since the predetermined color dashed line pattern includes the multiple dashed line patterns.

Dental 3D scanner 10 may transmit such a scanning result to analysis device 20 in accordance with at least one embodiment. The scanning result may be a 3D data of a target object. However, the embodiments of the present invention are not limited thereto. For example, dental 3D scanner 10 may transmit the color dashed line pattern images of the target object as the scanning result. In this case, analysis device 20 may calculate the 3D data based on the color dashed line pattern image of the target object.

Analysis device 20 may receive the scanning result from dental 3D scanner through a predetermined communication link and provide the scanning result to the designated profession. For example, such a scanning result may be the 3D data of the target object. In this case, analysis device 20 may reconstruct a 3D image of the target object based on the received 3D data and display the image of the target object in 3D. However, embodiments of the present disclosure are not limited thereto. For example, analysis device 20 may receive the color dashed line pattern image of the target object as the scanning result. In this case, analysis device 20 may generate the 3D data of the target object based on the color dashed line pattern image of the target object.

Furthermore, analysis device 20 is illustrated as an independent machine or device separated from dental 3D scanner 10. However, embodiments of the present disclosure are not limited thereto. For example, analysis device 20 may be implemented with dental 3D scanner 10 as one device. In this case, analysis device 20 may produce a 3D image data of the target object and transmit the 3D image data to a designated device, such as an independent monitor or a smart phone through a predetermined communication link. Upon receipt of the 3D image data, the monitor or the smart phone may display a 3D image of the target object.

Such analysis device 20 may be implemented with a computing system, such as a personal computer (PC) installed with a predetermined software program or application associated with displaying a 3D image of a target object or calculating a 3D data of a target object based on a color dashed line pattern image of the target object. However, the embodiments of the present disclosure are not limited thereto.

As described above, dental 3D scanner 10 may generate a color dashed line pattern, project the generated color dashed line pattern onto a target object, capture an image of the target object with the color dashed line pattern projected thereon, isolate multiple dashed line patterns from the captured image, and generate 3D data of the target object based on the isolated multiple dashed line patterns.

Hereinafter, constituent elements of dental 3D scanner 10 will be described with reference to FIG. 1. In accordance with at least one embodiment, dental 3D scanner 10 may include pattern projection circuit 100, image capturing circuit 200, controller circuit 300, communication circuit 400, reflecting plate 500, housing 600, penetration window 700, and memory 800.

Controller circuit 300 may control constituent elements of dental 3D scanner 10 for performing predetermined tasks in response to instructions. Such controller circuit 300 may be coupled to other constituent elements through a predetermined internal bus or cable. In particular, controller circuit 300 may be connected to image capturing circuit 200 through a camera trigger cable in order to deliver a trigger signal to image capturing circuit 200. Such controller circuit 300 may be a central processing unit (CPU).

For example, controller circuit 300 may control at least one of pattern projection circuit 100, image capturing circuit 200, communication circuit 400, and reflecting plate 500 for performing operations of i) generating color dashed line pattern data, ii) transferring the generated color dashed line pattern data to pattern projection circuit 100, iii) controlling pattern projection circuit 100 to produce a color dashed line pattern and project the produced color dashed line pattern on a target object, and iv) generating a trigger signal in response to a user input in order to initiate pattern projection circuit 100 to project the color dashed line pattern and image capturing circuit 300 to capturing images of the target object with the color dashed line pattern projected thereto (e.g., color dashed line pattern image of the target object).

Furthermore, controller circuit 300 may perform operations of, v) receiving sensing results from image capturing circuit 200, vi) processing the sensing results, such as sampling the sensing results, vii) generating 3D data (e.g., depth data) of the target object for producing a 3D image of the target object, based on the processing result (e.g., sampling results), and viii) transmitting the generated 3D data to a designated device (e.g., analysis device 20, a computer, a smart phone, and a mobile device) through communication circuit 400.

In accordance with at least one embodiment, controller circuit 300 may produce a color dashed line pattern data for controlling pattern projection circuit 100 to project a color dashed line pattern onto a target object. Such a color dashed line pattern may enable completely scanning a target object in 3D at a high speed (e.g., comparatively short time) with fewer operation times. The color dashed line pattern may include multiple dashed line patterns each can be individually used for calculating a 3D data (e.g., depth data) of the target object. Such color dashed line pattern will be described in more detailed with reference to FIG. 4.

Communication circuit 400 may establish a communication link between dental 3D scanner 10 and at least one designated device. For example, communication circuit 400 may establish a communication link to analysis device 20. Furthermore, communication circuit 400 may transmit data to the designated device and receive data from the designated device through the established communication link. For example, communication circuit 400 may transmit a scanning result to analysis device 20 or receive a control signal from analysis device 20 through the established communication link. In order to support such communication, communication circuit 400 may include at least one module for supporting a wired communication scheme, a wireless communication scheme, a near field communication (NFC) scheme, a Bluetooth communication scheme, a universal serial bus (USB) communication scheme and so forth. Furthermore, communication circuit 400 may include various interfaces for supporting various communication schemes. For example, when analysis device 20 has an operating system of Windows 7®, communication circuit 400 may include a universal seral bus (USB) 2.0 part for supporting USB communication scheme between dental 3D scanner 10 and analysis device 20.

Pattern projection circuit 100 may i) receive the color dashed line pattern data from controller circuit 300, ii) form a color dashed line pattern based on the received color dashed line pattern data, and iii) project the color dashed line pattern onto a target object inside an intraoral structure. Pattern projection circuit 100 may radiate a color light while performing a scanning operation, as a lighting for scanning the target object.

In order to project the color dashed line pattern, pattern projection circuit 100 may include at least one pico projector module. Pattern projection circuit 100 may further include multiple optical lenses that are carefully rearranged for miniaturizing an overall size of dental 3D scanner 10. Such pattern projection circuit 100 will be described in more detail with reference to FIG. 2 and FIG. 3.

Image capturing circuit 200 may receive a trigger signal from controller circuit 300, capture an image of a reflected light from the target object, and transmit the captured image to the controller circuit 300. Here, the reflected light may be a color dashed line pattern reflected from the target object, which is generated by projecting a color dashed line pattern onto the target object.

In particular, image capturing circuit 200 may capture at last one image of the target object with the color dashed line pattern projected thereon. Such an at least one image of the target object may be a color dashed line pattern image of the target object. That is, image capturing circuit 200 may sense a color dashed line pattern light reflected from the target object by projecting the color dashed line pattern onto the target object. Image capturing circuit 200 may transfer the captured image of the target object with the color dashed line pattern projected thereon to controller circuit 300.

In order to sense the reflected light of the color dashed line pattern or capture the image thereof, image capturing circuit 200 may include at least one optical sensor. Such an at least one optical sensor may be a light receiving element, such as a complementary metal-oxide semiconductor (CMOS), a charged coupled device (CCD), or a position sensitive device (PSD).

Memory 800 may be data storage for storing information necessary for driving constituent elements of dental 3D sensor 10 and for performing scanning a target object in 3D using a color dashed line pattern. Such information may include any software programs, applications, and coding sequences. Furthermore, information may include intermediate data or resultant data generated or produced by performing operations for scanning a target object in 3D using a color dashed line pattern. For example, information may include a 3D data, a 3D image data, a depth data, images, a color dashed line pattern data, a color dashed line pattern, and generation rules for the color dashed line pattern.

Such memory 800 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

Reflecting plate 500 may be disposed at one end of housing 600, above light projection/scanning window 700, to face pattern projection circuit 100 and image capturing circuit 200 at a predetermined angle. Reflecting plate 500 may reflects a color dished line pattern light projected from pattern projection circuit 100 to the target object by changing a propagation direction of the color dashed line pattern light. Furthermore, reflecting plate 500 may reflects a reflected light from the target object to image capturing circuit 200 by changing a propagation direction of the reflected light.

Housing 600 may be a rigid casing of 3D dental scanner 10, which encloses and protects constituent elements, such as pattern projection circuit 100, image capturing circuit 200, controller circuit 300, memory 800, and so forth. Furthermore, housing 600 may be an outer shape or appearance of 3D dental scanner 10. In accordance with at least one embodiment, housing 600 may have a size and a shape to be easily held or grabbed by hands or fingers of an operator. For example, housing 600 may have a large pencil shape having light projection/scanning window 700 at one end and a cable (not shown) or an antenna (not shown) at the other end.

Housing 600 may include light projection/scanning window 700 configured to project the color dashed line pattern onto the target object and to scan the reflected pattern light from the target object.

As described above, dental 3D scanner 10 may generate and project a color dashed line pattern onto a target object and scan the target object in 3D based on the projected color dashed line pattern in accordance with at least one embodiment. In order to project the color pattern, dental 3D scanner 10 may include pattern projection circuit 100. Hereinafter, such pattern projection circuit 100 will be described in more detail with reference to FIG. 2 and FIG. 3.

Figure 2:
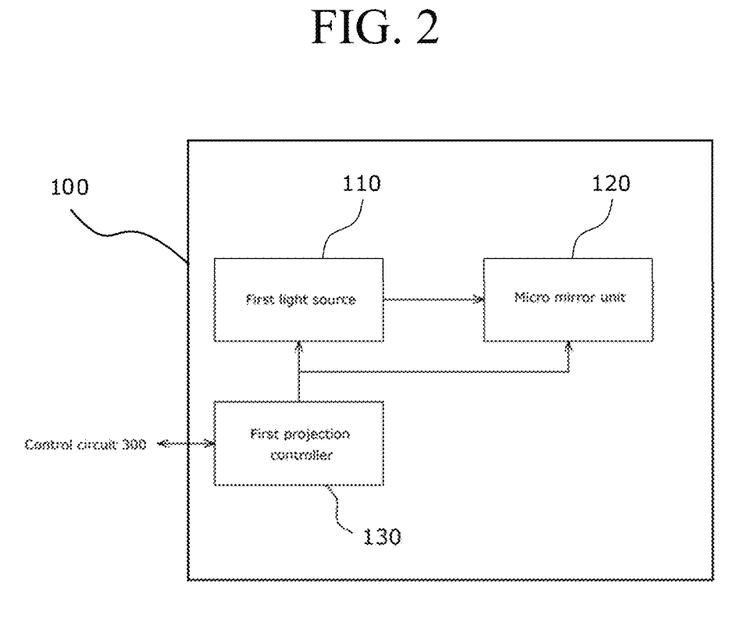
FIG. 2 illustrates a pattern projection circuit included in a dental 3D scanner in accordance with one embodiment of the present disclosure.

FIG. 2 illustrates a pattern projection circuit included in a dental 3D scanner in accordance with one embodiment of the present disclosure.

Referring to FIG. 2, pattern projection circuit 100 may include first light source 110, micro mirror unit 120, and first projection controller 130.

For example, as pattern projection circuit 100 in accordance with an embodiment of the present disclosure, a digital light processing (DLP) projector circuit may be employed. Such a DLP projector circuit may use a digital micro-mirror device (DMD) chip to project light. The DMD chip is a semiconductor optical switch integrated with micro-mirrors. In particular, each aluminum alloy micro-mirror is formed above each cell of a static random access memory (SRAM). Such an aluminum alloy micro-mirror may have ±10° degree of an angle when the aluminum alloy micro-mirror has an ON state and an OFF state. At this moment, the aluminum alloy micro-mirror is driven using electrostatic field generated by a corresponding cell disposed beneath of the aluminum alloy micro-mirror.

Such a micro-mirror reflects the projected light out or blocks the projected light. By controlling a time of reflecting or a time of blocking the projected light, DLP projector may display images on a screen. Furthermore, three color filters, Red, Green, and Blue may be disposed between a light source and a micro-mirror for displaying a color image. A speed of switching each mirror is about 500,000 times per one second and light incident to a chip is controlled digitally.

First light source 110 may output light to a target object inside a mouth in response to a control signal of first projection controller 130. First light source 100 may include light emitting elements, such as a laser diode or a RGB light emitting diode (LED), but the embodiments of the present disclosure are not limited thereto. First light source 110 may include a white light source or an infrared light source.

Micro-mirror unit 120 may reflect light output from first light source 110 by controlling an angle of a micro-mirror in response to control of first projection controller 130. That is, micro-mirror unit 120 may be corresponding to a DMD chip of a DLP projector. Micro-mirror unit 120 may include at least one micro-mirror, having a size of about 14 to 16 µm, at each pixel and control the at least one micro-mirror to have a certain reflection angle in response to a control signal from first projection controller 130, thereby projecting a color dashed line pattern.

First projection controller 130 may receive the color dashed line pattern data from controller circuit 300, produce the color dashed line pattern by controlling first light source 110 and micro mirror unit 120 based on the received color pattern data, and project the produced color dashed line pattern light onto the target object. That is, first projection controller 130 may control driving elements (not shown)

disposed under that micro-mirrors of micro-mirror unit 120 and change an angle of each micro-mirror to reflect or block light.

Figure 3:
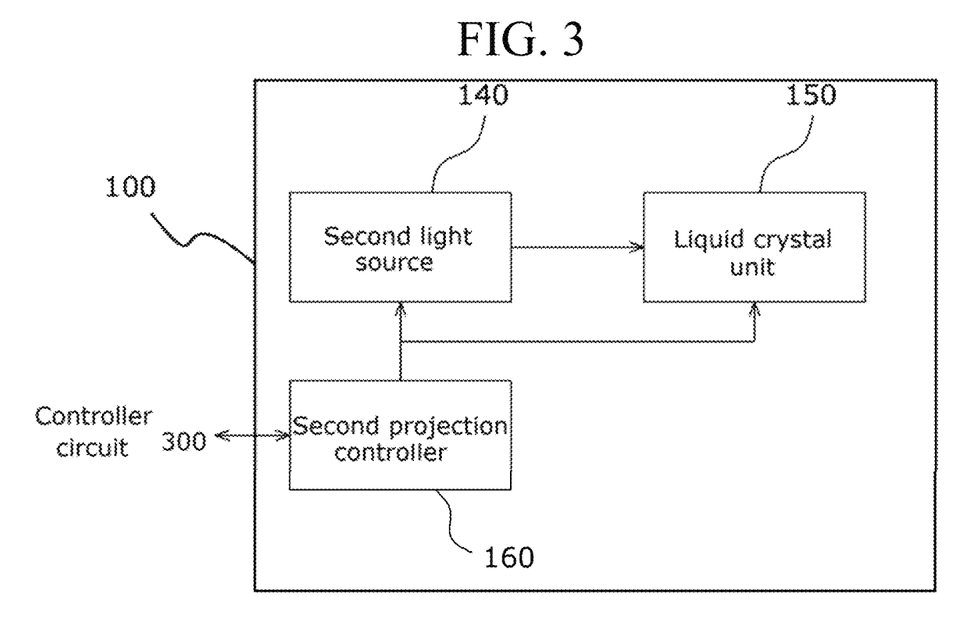
FIG. 3 illustrates a pattern projection circuit included in a dental 3D scanner in accordance with another embodiment of the present disclosure.

FIG. 3 illustrates a pattern projection circuit included in a dental 3D scanner in accordance with another embodiment of the present disclosure.

Referring to FIG. 3, pattern projection circuit 100 may include second light source 140, liquid crystal unit 150, and second projection controller 160 in accordance with another embodiment of the present disclosure.

For another example, a liquid-crystal display (LCD) type projector may be employed as pattern projection circuit 100 in accordance with another embodiment. In particular, second light source 140 may output light to a target object inside a mouth in response to a control signal of second projection controller 150. Second light source 140 may include light emitting elements, such as a Xenon lamp or a LED lamp.

LCD unit 150 may form a color dashed line pattern on a LCD panel in response to a control signal of second projection controller 160 and control light generated from second light source 140 to pass through the LCD panel with the color dashed line pattern formed thereon. LCD unit 150 may include at least one of lens in front of a micro LCD panel and in back of the micro LCD panel in order to concentrate the light to a light path.

Second projection controller 160 may receive the color dashed line pattern data from controller circuit 300 and control second light source 140 and LCD unit 150 based on the received color dashed line pattern data to produce the color dashed line pattern light and project the produced color dashed line pattern light onto the target object. That is, second projection controller 160 may generate and output a control signal for controlling each pixel of a LCD panel whether to pass a light or not. Based on such a control signal, pattern projection circuit 100 produces a color dashed lien pattern light and projects the produced color dashed line pattern light to the target object.

As described, a color dashed line pattern may be projected onto a target object for efficiently, instantly, and completely scanning the target object in 3D in accordance with at least one embodiment. Hereinafter, such a color dashed line pattern will be described in detail with reference to FIG. 4.

Figure 4:
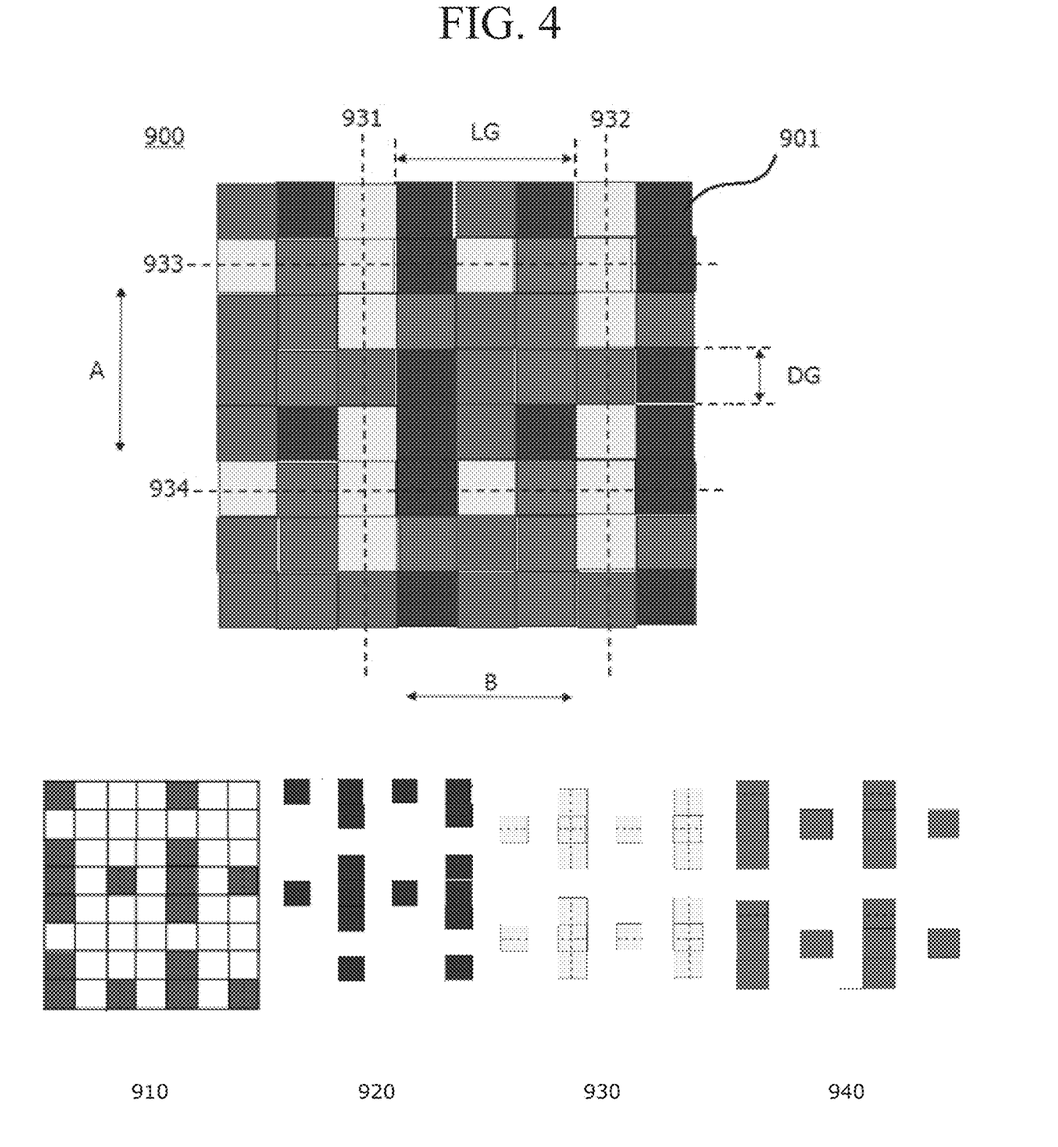
FIG. 4 illustrates a color dashed line pattern in accordance with at least one embodiment of the present disclosure.

FIG. 4 illustrates a color dashed line pattern in accordance with at least one embodiment of the present disclosure.

Referring to FIG. 4, color dashed line pattern 900 may be generated to obtain 3D data of a target object using a projection moiré method in accordance with at least one embodiment. Such color dashed line pattern 900 may be generated to include at least two dashed line patterns in accordance with at least one embodiment. Each one of the at least two dashed line patterns has a unique color different from the other. When a first dashed line pattern and a second dashed line pattern are included in the color dashed line pattern, the first dashed line pattern is formed of a plurality of first dashed lines, and the second dashed line pattern is formed of a plurality of second dashed lines. Furthermore, the first dashed line pattern has a unique color different from that of the second dashed line pattern. That is, the first dashed lines have the same unique color different from that of the second dashed lines. Each dashed line is formed of a plurality of dashes. Each dash is formed of at least one dot (e.g., pixel). To form a predetermined pattern, such dashed lines are arrange to satisfy a rule that a line gap between two adjacent dashed lines is greater than a dash gap between two adjacent dashes.

For example, FIG. 4 shows color dashed line pattern 900 generated to include four different dashed line patterns in accordance with at least one embodiment. For convenience and ease of understanding, color dashed lien pattern 900 is illustrated as including four different dashed line patterns. However, embodiments of the present disclosure are not limited thereto.

As shown in FIG. 4, color dashed line pattern 900 includes four dashed line patterns, such as red dashed line pattern 910, blue dashed line pattern 920, yellow dashed line pattern 930, and purple dashed line pattern 940. As shown, each dashed line pattern has a unique color different from the other in order to identify or isolate each pattern from the other although four different dashed line patterns are merged together in color dashed line pattern 900.

Each one of dashed line patterns 910, 920, 930, and 940 includes a plurality of dashed lines. As described, each dash line is formed of at least one dash. One dash is formed of at least one pixel 901. Such dash lines are arranged by a predetermined rule to form a unique pattern to obtain 3D information on a target object in accordance with at least one embodiment. For example, dash lines are arranged to have a line gap between two adjacent dashed lines greater than a dash gap between two adjacent dashes in accordance with at least one embodiment.

For example, yellow dashed line pattern 930 includes a plurality of yellow dashed lines 931, 932, 933, and 934. In a first direction A, yellow dashed lines 931 and 932 are arranged. Each of yellow dashed lines 931 and 932 includes dashes each formed of three pixels. Such yellow dashed lines 931 and 932 are arranged to have a line gap LG between yellow dashed lines 931 and 932 greater than a dash gap DG. For example, the line gap LG is three pixels, and the dash gap DG is one pixel, as shown in diagram (a) of FIG. 4.

In a second direction B, yellow dashed lines 933 and 934 are arranged. Each of yellow dashed lines 933 and 934 includes dashes each formed of one pixel. Such yellow dashed lines 933 and 934 are arranged to have a line gap LG between yellow dashed lines 933 and 934 greater than a dash gap DG. For example, the line gap LG is three pixels, and the dash gap DG is one pixel, as shown in diagram (a) of FIG. 4.

As shown in FIG. 4, other three dashed line patterns 910, 920, and 940 have the same arrangements of dashed lines, as compared to yellow dashed line pattern 930. Accordingly, color dashed line pattern 900 includes four dashed line patterns 910, 920, 930, and 940 each including a plurality of dashed lines arranged to satisfy a predetermined rule to obtain 3D data of a target object in accordance with at least one embodiment.

For convenience and ease of understanding, color pattern 900 is described as having four different dashed line patterns arranged in first direction A (e.g., vertical direction) and second direction B (e.g., horizontal direction). However, embodiments of the present disclosure are not limited thereto. For example, color pattern 900 may include at least one different line patterns arranged in a diagonal direction. Furthermore, embodiments of the present disclosure are not limited to the number patterns included in color pattern 900. Color pattern 900 may include more or less than four patterns.

In accordance with at least one embodiment, the predetermined color dashed line pattern may be generated as follows: i) a color dashed line pattern may be generated to include multiple dashed line patterns; ii) each of multiple dashed line patterns may be generated to have a unique color different from others; and iii) dashed lines of each dashed line pattern are arranged to have a line gap greater than a dash gap.

In accordance with another embodiment, the predetermined color dashed line pattern may be generated as follows: i) a color dashed line pattern may be generated to have at least two first patterns and at least two second patterns; ii) the at least two first patterns may be generated to arranged in a first direction; iii) the at least two second patterns may be generated to arranged in a second direction crossing the first direction; iv) the first patterns may be generated to have a first color; v) the first patterns may be generated to have a plurality of first unit patterns each having a length of m pixels, wherein m is a positive integer greater than 0; and vi) the plurality of first unit patterns may be generated to be arranged with a third unit pattern having a length of n pixels as a gap between two adjacent first unit patterns, wherein the third unit pattern has a third color and a third length, and n is a positive integer number greater than 0 and smaller than m.

Furthermore, vi) the second patterns may be generated to have a second color; vii) the second patterns may be generated to have a plurality of second unit patterns each having a length of m pixels, wherein m is a positive integer greater than 0; and viii) the plurality of second unit patterns may be generated to be arranged with a fourth unit pattern having a length of n pixels as a gap between two adjacent second unit patterns, wherein the fourth unit pattern has a fourth color and a fourth length, and n is a positive integer number greater than 0 and smaller then m.

Such color dashed line pattern 900 having multiple dashed line patterns 910 to 940 may be projected onto a target object. Then, a color dashed line pattern image of a target object may be captured. Such a color dashed line pattern image may include multiple different dashed line patterns as described above. In accordance with at least one embodiment, such multiple different dashed line patterns are isolated from the color dashed line pattern image. In particular, such multiple dashed line patterns may be individually isolated from the color dashed line pattern image of the target object, and 3D data of the target object may be calculated separately using each of the isolated multiple dashed line patterns. Such operations may be performed simultaneously. Accordingly, one color dashed line pattern image of the target object can be used to multiple dashed line patterns to calculate the 3D data of the target object since the predetermined color dashed line pattern includes the multiple dashed line patterns.

As described, dental 3D scanner 10 may generate a color dashed line pattern, project the generated color dashed line pattern onto a target object, capture an image of the target object with the color dashed line pattern projected thereon, isolate multiple dashed line patterns from the captured image, and generate 3D data of the target object based on the isolated multiple dashed line patterns. Hereinafter, operations of dental 3D scanner 10 will be described in detail with reference to FIG. 5.

Figure 5:
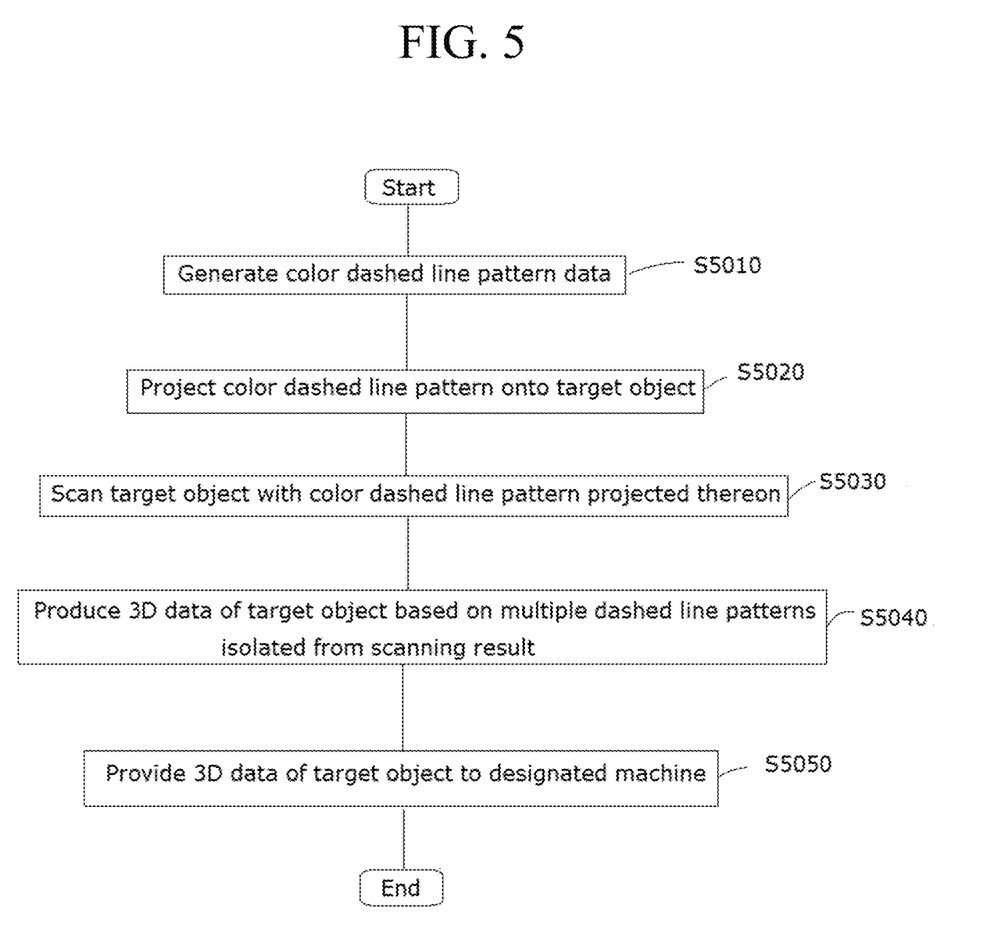
FIG. 5 illustrates a method for scanning a target object in 3D using a color dashed line pattern in accordance with at least one embodiment.

FIG. 5 illustrates a method for scanning a target object in 3D using a color dashed line pattern in accordance with at least one embodiment.

Referring to FIG. 5, a color dashed line pattern data may be generated upon generation of a predetermined event at step S5010. For example, dental 3D scanner 10 may receive a scanning signal from a designated profession when the designated profession wants to scan a target object (e.g., target teeth inside a mouth) in 3D. In particular, upon the generation of such event (e.g., receipt of the scanning signal), communication circuit 400 may receive such a scanning signal directly through a predetermined input circuit or indirectly through analysis device 20.

When communication circuit 400 receives the scanning signal, controller circuit 300 may generate color dashed line pattern data. As described, such a color dashed line pattern data may be generated to form and project a color dashed line pattern onto the target object. In accordance with at least one embodiment, such a color dashed line pattern data may be used to form a color dashed line pattern including multiple dashed lines arranged to satisfy rules: i) each dashed line has a unique color different from others, ii) one dashed line is formed of at least one dash, iii) one dash is formed of at least one pixel, and iv) a line gap between two adjacent same color dashed lines is greater than a dash gap between two adjacent same color dashes.

At step S5020, a color dashed line pattern may be formed based on the color dashed line pattern data and projected onto a target object. For example, pattern projection circuit 100 may receive the color dashed line pattern data from controller circuit 300, form a color dashed line pattern (e.g., 900) based on the received color dashed line pattern data, and project the color dashed line patter on to a target object (e.g., 30).

As described above, such a color dashed line pattern may include multiple dashed line patterns which are arranged to satisfy rules: i) each dashed line has a unique color different from others, ii) one dashed line is formed of at least one dash, iii) one dash is formed of at least one pixel, and iv) a line gap between two adjacent same color dashed lines is greater than a dash gap between two adjacent same color dashes. Since the color dashed line pattern was already described with reference to FIG. 4, the detailed description thereof will be omitted herein.

At step S5030, the color dashed line pattern projected on the target object may be scanned. For example, image capturing circuit 200 may capture at last one image of the color dashed line pattern projected on the target object (e.g., teeth 30), which is reflected from the target object by projecting the color pattern on the target object. Image capturing circuit 200 may transfer the captured image of the color dashed line pattern projected on the target object to controller circuit 300.

Such at least one image of the color dashed line pattern projected on the target object may be a color dashed line pattern image of the target object. Such a color dashed line pattern image may include images of the multiple dashed line patterns included in the color dashed line pattern.

At step S5040, a 3D data of the target object may be produced based on multiple dashed line patterns isolated from the scanning result. For example, controller circuit 300 may receive the captured color dashed line pattern images from image capturing circuit 200 and isolate each color dashed lines from the captured image. For example, when four color dashed lines (e.g., red, blue, purple, and yellow) are included in the color dashed line pattern images as shown in FIG. 4, controller circuit 300 may isolate red color dashed line image 910, blue color dashed line image 920, purple color dashed line image 940, and yellow color dashed line image 930 from the color dashed line pattern image.

Then, controller circuit 300 may calculate depth data of the target object by sampling the four patterns (e.g., the red color dashed line image, the blue color dashed line image, the purple color dashed line image, and the yellow color dashed line image) isolated from the received color dashed line pattern image.

As described, although the color dashed line pattern is projected one time onto the target object, four different dashed line patterns are obtained for calculating a depth data of the target object. Accordingly, a 3D data of a target object may be obtained at a comparatively short time with fewer scanning operations.

At step S5050, the 3D data of the target object may be delivered to a designated machine. For example, the generated 3D data may be transferred to a display attached to analysis device 20 and the 3D image of the target object may be displayed on the display. Through the 3D image, the designated profession may be efficiently and conveniently examine the target object.

For another example, the generated 3D data may be transferred to a 3D printer or a 3D mill for producing a predetermined object (e.g., tooth, crowns, bridges, copings, frameworks, implant abutments).

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of scanning a target object in three dimensions (3D) comprising:
   projecting color patterns onto a target object, wherein the color patterns include multiple line patterns, wherein each of the multiple line patterns has a unique color and includes at least two pairs of lines repeatedly arranged in a first direction and a second direction respectively, wherein the first direction and the second direction cross each other;
   scanning the target object with the color patterns projected thereto to obtain a scanning result; and producing a 3D data of the target object by processing the scanning result, wherein, every line of each pair is formed of a plurality of dashes having dash gaps between the dashes, and line gaps are placed between the lines with the same pattern and color, and the line gaps in the second direction are equal to or greater than the dash gaps in the first direction.

2. The method of claim 1, wherein the scanning includes:
capturing an image of the color line patterns projected to the target object; and
providing the image of the captured color line patterns projected to the target object as the scanning result.

3. The method of claim 1, wherein the producing the 3D data includes:
isolating the color line patterns from the scanning results;
individually sampling each of the multiple line patterns from the isolated color patterns; and
generating a depth data of the target object based on the sampling results of the isolated color line patterns.

4. The method of claim 1, further comprising:
providing the 3D data of the target object to a designated machine through a predetermined communication link.

5. A apparatus of scanning a target object in three dimensions (3D) comprising:
a projection circuit configured to project color patterns onto a target object, wherein the color patterns include multiple line patterns, wherein each of the multiple line patterns has a unique color and includes at least two pairs of lines repeatedly arranged in a first direction and a second direction respectively, wherein the first direction and the second direction cross each other;
an image capturing circuit configured to scan the target object with the color patterns projected thereto; and
a processor configured to produce a 3D data of the target object by processing the scanning result,
wherein, every line of each pair is formed of a plurality of dashes having dash gaps between the dashes, and line gaps are placed between the lines with the same pattern and color, and the line gaps in the second direction are equal to or greater than the dash gaps in the first direction.

6. The apparatus of claim 5, wherein the processor is further configured to:
capture an image of the color patterns projected to the target object; and
provide the captured image of the color patterns projected to the target object as the scanning result.

7. The apparatus of claim 5, wherein the processor is further configured to:
isolate the color line pattern from the scanning results;
individually process each of the isolated multiple line patterns by performing sampling; and
generate a depth data of the target object based on the sampling results of the isolated color line patterns.

8. The apparatus of claim 5, further comprising:
a communication circuit configured to provide the 3D data of the target object to a designated machine through a predetermined communication link.

* * * * *